United States Patent
Wille

Patent Number: 6,047,058
Date of Patent: Apr. 4, 2000

[54] COMMUNICATION SYSTEM OF AT LEAST TWO PRIVATE BRANCH EXCHANGES HAVING A TEAM FUNCTION

[75] Inventor: Klaus Wille, München, Germany

[73] Assignee: Siemens Aktiengesellschaft, Munich, Germany

[21] Appl. No.: 09/281,819

[22] Filed: Mar. 30, 1999

Related U.S. Application Data

[63] Continuation of application No. PCT/DE97/02112, Sep. 18, 1997.

[51] Int. Cl.⁷ ..................................................... H04M 7/00
[52] U.S. Cl. ........................... 379/225; 379/219; 379/220; 379/229; 379/216
[58] Field of Search ..................................... 379/225, 219, 379/220, 221, 229, 230, 231, 232, 216, 196, 197, 198, 265, 309, 207

[56] References Cited

U.S. PATENT DOCUMENTS

| | | | |
|---|---|---|---|
| 5,670,950 | 9/1997 | Otsuka ..................................... | 379/225 |
| 5,764,750 | 6/1998 | Chau et al. ............................... | 379/225 |
| 5,805,692 | 9/1998 | Oerlemans et al. ...................... | 379/265 |
| 5,841,839 | 11/1998 | Fogg et al. ............................... | 379/225 |
| 5,966,437 | 10/1999 | Cox et al. ................................. | 379/309 |

*Primary Examiner*—Scott Wolinsky
*Assistant Examiner*—Benny Q. Tieu
*Attorney, Agent, or Firm*—Herbert L. Lerner; Laurence A. Greenberg; Werner H. Stemer

[57] ABSTRACT

A communication system includes at least two private branch exchanges which are each connected to a higher-level communication network and which are connected to one another through a hot-line link. A team-function controller in one private branch exchange performs a team function with respect to team terminals connected directly to that private branch exchange and with respect to team terminals, connected directly to the other private branch exchange, which are integrated into the team function in the form of remote subscribers through the hot-line link. Incoming calls to the team can reach the team controller through the network interface of the first communication system and through the network interface of the second communication system and a call diversion to the first communication system. In the case of a failure of the hot-line link, a team function subcontroller in the second private branch exchange cancels the call diversion and performs the control sequence of the team function for the team terminals connected to the second private branch exchange.

2 Claims, 1 Drawing Sheet

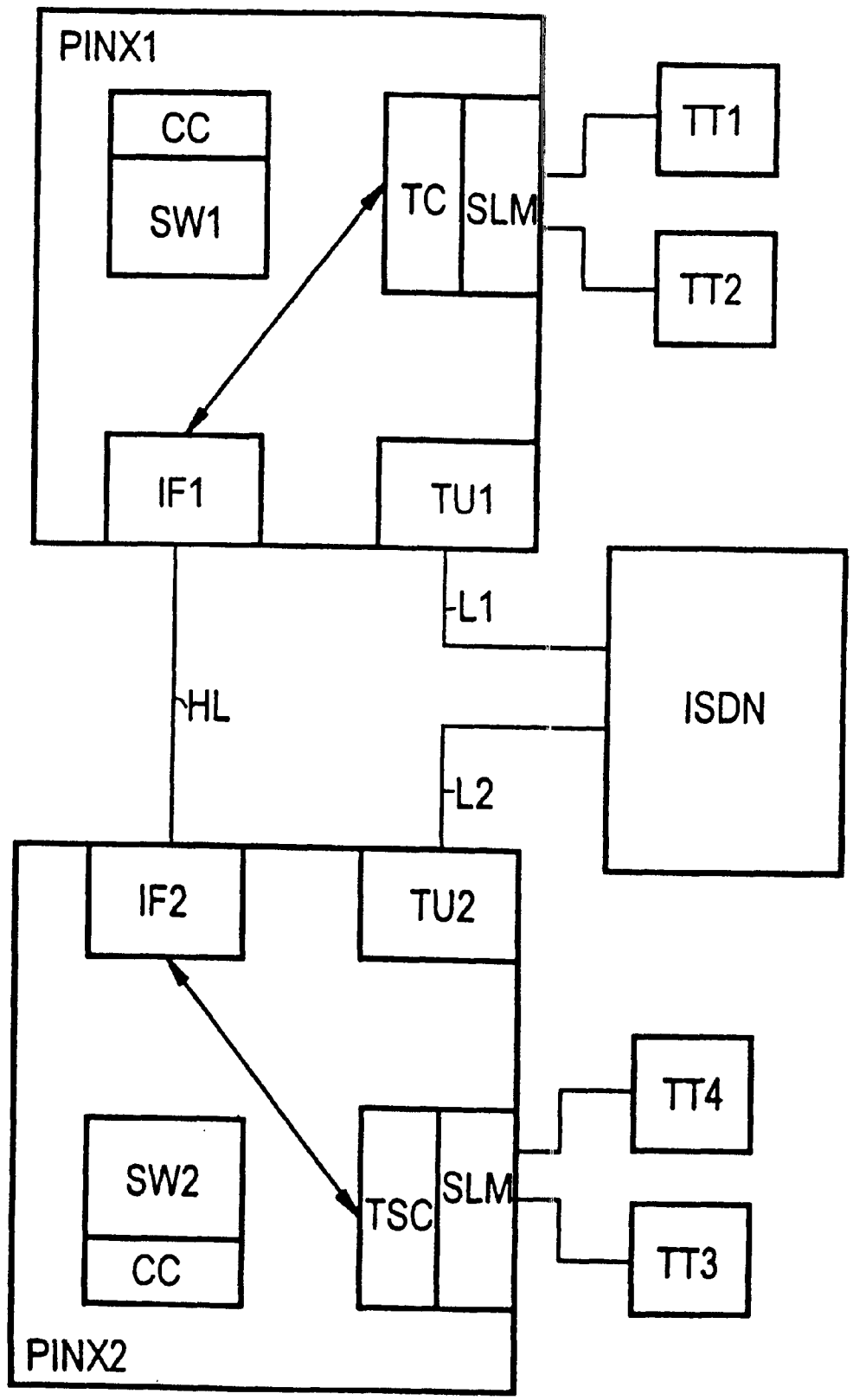

COMMUNICATION SYSTEM OF AT LEAST TWO PRIVATE BRANCH EXCHANGES HAVING A TEAM FUNCTION

CROSS-REFERENCE TO RELATED APPLICATION

This application is a continuation of copending International Application No. PCT/DE97/02112, filed Sep. 18, 1997, which designated the United States.

BACKGROUND OF THE INVENTION

Field of the Invention

The invention relates to a communication system including at least two private branch exchanges each having a call controller and at least one switching node connected to at least one higher-level communication network through a network interface unit and connected to terminals through at least one subscriber line module, one of the private branch exchanges having a team function controller controlling certain terminals as team terminals of a team, to be called through the switching node of that private branch exchange, in accordance with a team function and, in doing so, initiating signaling to other team terminals and influencing their call-processing state in dependence on a call-processing state of individual team terminals.

Such interconnected private branch exchanges, in at least one of which a team function is implemented, are known, among others, in the form of the HICOM 300 private branch exchange commercially sold by Siemens AG. A known team function is, for example, the "call acceptance" function in which incoming calls are indicated in a call acceptance group of a number of terminals and can be answered at any terminal which belongs to the call acceptance group. Another known team function is the "line group" function which can be reached under a social collective number. In that configuration, any subscriber of a line group can also be called directly through an individual call number. However, the special collective number reaches all subscribers. The collective number is allocated, for example, to a master terminal.

A further known team function is the integrated secretarial unit, which is also called a manager/secretary station.

In known communication systems, all subscribers of a team are connected to a single private branch exchange and are switched to a higher-level communication network through the same network interface unit.

SUMMARY OF THE INVENTION

It is accordingly an object of the invention to provide a communication system of at least two private branch exchanges having a team function, which overcomes the hereinafore-mentioned disadvantages of the heretofore-known devices of this general type and in which a team function can also be implemented with remote team subscribers.

With the foregoing and other objects in view there is provided, in accordance with the invention, a communication system, comprising at least one higher-level communication network; first and second team terminals; at least one first private branch exchange including a call controller, at least one first switching node, a first network interface unit connecting the at least one first switching node to the at least one higher-level communication network, at least one subscriber line module connecting the at least one first switching node to the first terminals, and a team function controller controlling certain of the terminals, in accordance with a team function, as team terminals of a team to be called through the first switching node, for initiating signaling to other team terminals and influencing their call-processing state in dependence on a call-processing state of individual team terminals; at least one second private branch exchange including a call controller, at least one second switching node, a second network interface unit connecting the at least one second switching node to the higher-level communication network, at least one subscriber line module connecting the at least one second switching node to the second terminals, and a team function subcontroller; a hot-line link connected between the first and second switching nodes; at least one of the first team terminals of the team connected directly to the first switching node as a terminal through the subscriber line module; at least one of the second team terminals connected to the second switching node, as a remote subscriber of the team, through the subscriber line module, and to be reached through the first switching node, the hot-line link and the second switching node; incoming calls to the team reaching the team function controller directly through the first network interface unit and through the second network interface unit and a call diversion function of the second private branch exchange; and the team function subcontroller in the second private branch exchange canceling the call diversion and performing a local team function sequence control upon detecting a disturbance in the hot-line link to the first private branch exchange.

A team function controller is provided in the first private branch exchange. This is why incoming calls for the team are normally conducted through the first communication device. However, incoming calls to the team can reach the communication system both through a network interface unit of the first private branch exchange and through a network interface unit of the second private branch exchange. Incoming calls for the team reaching the communication system through a network interface unit of the second private branch exchange are normally diverted to the team function controller provided in the first private branch exchange through the use of a call diversion function. If the hot-line link to the first private branch exchange or its switching node is disturbed, a team function subcontroller cancels the call diversion and takes over the local team function sequence control.

Connecting team terminals as remote subscribers through a hot-line link makes it possible to place subscribers of a team at an arbitrary spatial distance from one another within a corporate network.

In accordance with a concomitant feature of the invention, the team function subcontroller registers the availability of the hot-line link between the two private branch exchanges by checking the signaling link required for the transparent transmission of the subscriber-subscriber-messages for the remote subscribers. In this case, the availability check does not need any B-channel resources. In addition, no additional signaling is required.

Other features which are considered as characteristic for the invention are set forth in the appended claims.

Although the invention is illustrated and described herein as embodied in a communication system of at least two private branch exchanges having a team function, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a block diagram of a communication system according to the invention.

DESCRIPTION OF THE PREFERRED EMBODIMENTS

Referring now in detail to the single FIGURE of the drawing, there is seen a block diagram of a communication system formed of a first private branch exchange PINX1 including a call controller CC, a first switching node SW1, a team function controller TC and a first network interface device TU1 which is connected to a higher-level communication network ISDN through a link L1. A team terminal TT1 and a stand-by team terminal TT2 are each connected to the first switching node SW1 through a subscriber line module SLM and are controlled by the team function controller TC. The team function controller TC also controls a link to a first hot-line interface IF1.

A second private branch exchange PINX2 contains a call controller CC and a second switching node SW2, which is connected, among other things, to two team terminals TT3 and TT4 through a subscriber line module SLM. The second private branch exchange PINX2 is connected to the higher-level communication network ISDN through a second network interface unit TU2 and a link L2.

A team function subcontroller TSC controls the team terminals TT3 and TT4 as well as a link to a second hot-line interface IF2. The first hot-line interface IF1 of the first private branch exchange PINX1 is connected to the second hot-line interface IF2 of the second private branch exchange PINX2 through a hot-line link HL.

Incoming calls to the team are normally conducted through the first communication facility. However, incoming calls to the team can reach the communication system both through a network interface unit TU1 of the first private branch exchange PINX1 and through a network interface unit TU2 of the second private branch exchange PINX2. Incoming calls to the team reaching the communication system through a network interface unit TU2 of the second private branch exchange PINX2 are normally diverted to the team function controller provided in the first private branch exchange through a call diversion function. If the hot-line link HL to the first private branch exchange PINX1 or its switching node SW1 is disturbed, a team function subcontroller TSC cancels the call diversion and takes over the local team function sequence control.

I claim:

1. A communication system, comprising:

at least one higher-level communication network;

first and second team terminals;

at least one first private branch exchange including a call controller, at least one first switching node, a first network interface unit connecting said at least one first switching node to said at least one higher-level communication network, at least one subscriber line module connecting said at least one first switching node to said first team terminals, and a team function controller controlling certain of said Terminals, in accordance with a team function, as team terminals of a team to be called through said first switching node, For initiating signaling to other team terminals and influencing their call-processing state in dependence on a call-processing state of individual team terminals;

at least one second private branch exchange including a call controller, at least one second switching node, a second network interface unit connecting said at least one second switching node to said higher-level communication network, at least one subscriber line module connecting said at least one second switching node to said second team terminals, and a team function subcontroller;

a hot-line link connected between said first and second switching nodes;

at least one of said first team terminals connected directly to said first switching node as a terminal through said subscriber line module;

at least one of said second team terminals connected to said second switching node, as a remote subscriber of said second switching node, through said subscriber line module, and to be reached through said first switching node, said hot-line link and said second switching node;

incoming calls to at least one of said first and second team terminals reaching said team function controller directly through said first network interface unit and through said second network interface unit and a call diversion function of said second private branch exchange; and said team function subcontroller in said second private branch exchange canceling said call diversion and performing a local team function sequence control upon detecting a disturbance in said hot-line link to said first private branch exchange.

2. The communication system according to claim 1, wherein said team function subcontroller detects an availability of said hot-line link between said first and second switching nodes by checking a signaling link required for a transparent transmission of subscriber-subscriber-messages for remote subscribers.

* * * * *